United States Patent [19]

Smith

[11] 4,253,307
[45] Mar. 3, 1981

[54] SOLAR POWER GENERATOR AND WATER PURIFIER

[76] Inventor: Derrick A. Smith, 1180 S. Seabreeze Blvd., Ft. Lauderdale, Fla. 33316

[21] Appl. No.: 70,329

[22] Filed: Aug. 27, 1979

[51] Int. Cl.³ .......................... F03G 7/02; F03G 7/04
[52] U.S. Cl. ........................................ 60/641; 60/615
[58] Field of Search .......................... 60/641, 675, 715

[56] References Cited

U.S. PATENT DOCUMENTS

| 3,490,996 | 1/1970 | Kelly, Jr. | 60/641 |
| 3,905,352 | 9/1975 | Jahn | 60/641 |
| 3,953,971 | 5/1976 | Parker | 60/641 |

FOREIGN PATENT DOCUMENTS 505536  9/1954  Canada .

*Primary Examiner*—S. Clement Swisher

[57] ABSTRACT

A combined solar power generator and water purifier is provided herein. It includes a hollow globular boiler floating on and anchored atop a body of water to be purified. The globular boiler includes water inlet means disposed adjacent an upper portion of the globular boiler, an upwardly directed steam outlet conduit originating from an upper portion of the globular boiler, and a refractor lens window disposed within an upper half of the globular boiler. Controllable means are provided for directing the sun's rays towards the refractor lens window to generate heat to boil water in the boiler. A primary turbine is disposed at a level above that of the boiler, the primary turbine being connected to the steam outlet conduit and being driven by steam under pressure from the boiler. Steam condenser means are connected to the outlet from the primary turbine for dissipating residual heat in the steam effluent from the turbine and for condensing such steam as substantially pure water. A reservoir is connected to the outlet from the condenser means and such reservoir is disposed at a level which is lower than that of the primary turbine, but at a level which is higher than that of the globular boiler, for receiving such substantially pure water. A secondary turbine for the generation of electricity is disposed at a level which is lower than that of the reservoir but which is higher than that of the globular boiler. The secondary turbine is connected to the outlet from the reservoir and is driven by water from the reservoir. A pure water effluent is provided from the secondary turbine for use wherever pure water is required. Such solar power generator is thus very energy efficient.

6 Claims, 1 Drawing Figure

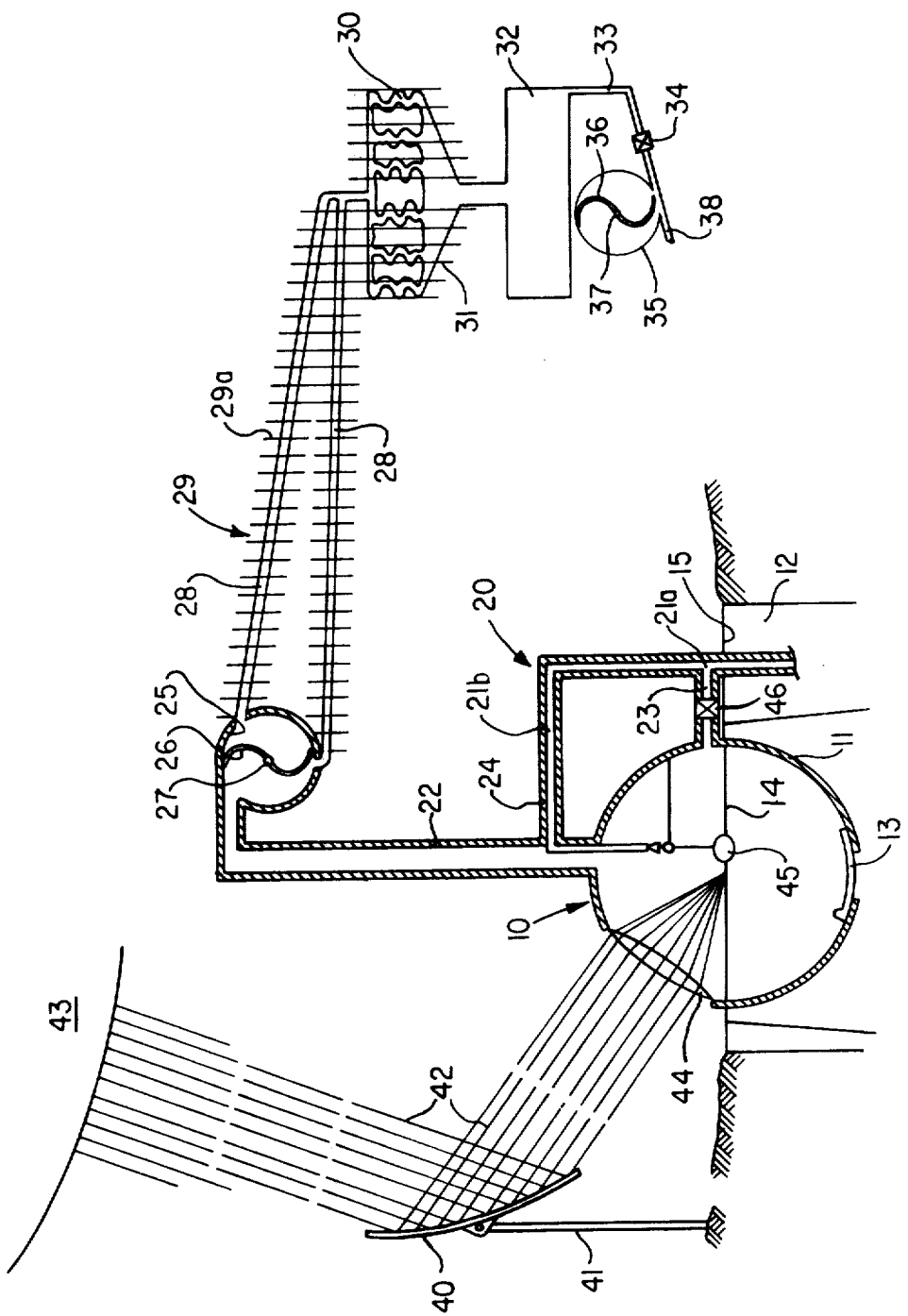

SOLAR POWER GENERATOR AND WATER PURIFIER

BACKGROUND OF THE INVENTION (i) Field of the Invention

This invention relates to a solar power generator apparatus for harnessing energy from the sun and for purifying (i.e., desalination, etc.) water in the use of such apparatus.

(ii) Related Application

This invention is related to applicant's copending application Ser. No. 293,792.

(iii) Description of the Prior Art

Electricity is one of the most widely used forms of energy. It is known that electricity may be produced by hydroelectric generators, combustion engines powered by expensive fuel, e.g. oil or natural gas, or by electromotive steam engines powered by coal, or by the use of nuclear energy. These procedures suffer the deficiency that they may use diminishing non-renewable resources, and of pollution of the environment. It is also known that purification of water is very important for agricultural, domestic and industrial uses, but that the expense of purification is quite often prohibitive.

It would therefore be advantageous if pure water and electricity could be simultaneously produced with the advantages pointed out above but with fewer of the aforementioned disadvantages.

Many proposals have been made to achieve these ends. In one proposal, that provided by Canadian Patent No. 145,581 issued Jan. 28, 1913 to R. A. Fessenden, apparatus was provided for obtaining power from the sun's radiant energy, which included the combination of a reservoir and a working fluid therein exposed to be heated by the sun's radiant energy, means for protecting such fluid against loss of heat by convection, a low pressure turbine and means to operate it by that fluid, and an upper fluid reservoir and a lower fluid reservoir combined to store energy generated by the turbine. The problem which that inventor apparently desired to solve was that of protection of the working fluid against heat loss by convection.

In another system, that provided by Canadian Patent No. 505,536 issued Sept. 7, 1954 to Agnew, the patentee attempted to provide improved apparatus that utilized the energy of solar rays for effecting a temperature differential between a quantity of water or other liquid and the atmosphere thereabove, to conduct the resultant vapors to a higher level, and then to condense the vapors and store the liquid thus provided. The vapors created power to generate electric current. A heat exchange was effected between a source of water supply and a quantity of the water obtained from the supply to increase vaporization of the quantity of water. This was apparently solved by a solar engine including the combination of a reservoir, a basin for receiving liquid from the reservoir, a differential-pressure conduit extending from the reservoir to the basin for passing liquid into the latter, a transparent dome for the basin (comprising a plurality of flat sheets for transmitting solar rays to evaporate the liquid in the basin), a closed-circuit thermo-siphon heat exchanger extending from the reservoir and into the liquid in the basin for increasing the evaporative rate of the liquid, an upwardly directed duct extending from the dome to conduct the evaporated liquid to a level above, and at a substantially lower atmospheric pressure, than that of both the reservoir and the basin, a condenser at the upper end of the duct to condense the vapors, means for removing free air from the condenser, a storage reservoir elevated above the first-mentioned reservoir, and a differential-pressure conduit leading from the condenser to the storage reservoir. The problem apparently to be solved by this patentee was to avoid the detrimental effect on the heat exchange characteristics of the presence of free air in the condenser circuit.

In a third system, that provided by Canadian Patent No. 669,504 issued Aug. 27, 1963 to Podolny, the patentee desired to provide an arrangement for storing some of the heat energy from the sun so that it might be utilized during the intervals when the device was not exposed to the radiant heat of the sun; and also to provide a power-plant in which a chemical compound was used which could be separated into its constituents electrically, together with an arrangement for storing the constituents, to be later combined chemically for producing electrical energy for the powerplant. These ends were apparently met by a solar energy powerplant including the combination of a boiler, a mirror for concentrating radiant heat on the boiler, a turbine powered by vapor under pressure from the boiler, and a generator driven by the turbine in combination with an electrolysis device for separating a compound into its constituents, storage means for the constituents, a fuel cell in which the constituents are combined to produce electrical energy, and control means for selectively connecting the generator to the electrolysis device and to a load or connecting the fuel cell to the load. The problem thus apparently solved by this patentee was to store the sun's energy in the form of constituents of a chemical which could later be recombined to provide electrical energy.

SUMMARY OF THE INVENTION (i) Aims of the Invention

It is seen therefore that the primary object of providing purification of water coupled with generation of electrical energy both in the daytime and at night has not yet been solved. However, by the present invention, this can be achieved by using a primary energy supply which is inexpensive, limitless and pure, namely the sun, in conjunction with the particular construction to be described hereinafter.

(ii) Statement of the Invention

Thus, by this invention, a combined solar power generator and water purifier is provided comprising: (a) a hollow globular boiler floating on, and anchored atop a body of water, the boiler including water inlet means disposed adjacent an upper portion of the globular boiler, an upwardly directed steam outlet conduit originating from an upper portion of the globular boiler, and a refractor lens window also disposed within an upper portion of the globular boiler; (b) controllable means for directing the sun's rays toward the refractor lens window to generate heat to boil water in the globular boiler; (c) a primary turbine for the generation of electricity disposed at a level above that of the globular boiler, such primary turbine being connected to the steam outlet conduit and being driven by steam under pressure from the boiler; (d) steam condenser means connected to the outlet from the turbine for dissipating residual heat in the steam which has been discharged from the primary turbine and for condensing the steam as substantially pure water; (e) a reservoir connected to the outlet from the condenser means and disposed at a level which is lower than the primary turbine but which preferably is disposed at a level lower than the globular boiler, for receiving such substantially pure water; (f) a secondary turbine for the generation of electricity disposed at a level lower than the reservoir but preferably higher than that of the globular boiler, such secondary turbine being connected to the reservoir and being driven by water from the reservoir; and (g) pure water effluent means from the secondary turbine.

(iii) Other Features of the Invention

By one feature thereof, the steam condenser means includes a radiator connected to the primary turbine for simultaneously recovering useful heat from the steam and for partially condensing the steam to water, and a condenser connected to the radiator for substantially completely condensing the steam to water.

By another feature, the solar power generator includes a valve for controlling the flow of water from the reservoir to the secondary turbine.

By yet another feature, the solar power generator includes a valve automatically sequenced for periodic opening, to permit flow of water from the reservoir to the secondary turbine, and for periodic closing, to cut off such water flow.

By a still further feature, means (g) comprises a paraboloid reflector mounted on a post.

By yet another feature, the reservoir (e) is disposed at a level higher than the level of said globular boiler; and the secondary turbine (f) is disposed at a level which is higher than that of the globular boiler.

BRIEF DESCRIPTION OF THE DRAWING

In the accompanying drawings, the single FIGURE is a schematic drawing of a solar power generator of one aspect of this invention as a combined desalination water purification plant and as an electrical power generating plant.

DESCRIPTION OF PREFERRED EMBODIMENTS

(i) General Description

The embodiment of the invention illustrated is applicable wherever sunlight reaches and wherever a body of water, whether saline, brackish, impure or clean, is available.

Generally, this solar power generator includes a ray collector which collects the rays of the sun, partially converges them and refracts them through a refractor lens which completes the convergence and yields high temperatures, which vaporizes the water in the boiler and produces steam that drives the day generator. The steam is then conducted through the radiator where most of its sensible heat will be released, then to the condenser where the remainder of the sensible heat and its latent heat will dissipate and the vapor will condense. The condensate will accumulate in the reservoir. This water will be pure distilled water. It will be released at night to drive the night generator.

The pure water leaving the night generator may now be used in homes, factories, and agricultural projects.

(ii) Description of the Figure

As seen in the drawing, the heart of the present invention is the globular boiler 10. The globular boiler 10 comprises a hollow globular vessel 11 floating on and anchored atop a body of water 12, the boiler including a trap door 13 for access to the interior of globular boiler 10 for the servicing thereof. The level 14 of the water in vessel 11 is the same as the level 15 of the main body of water.

A water inlet means, preferably a make-up water assembly 20 is provided including an inverted "L" shaped leg provided by a vertical segment 21a and horizontal segment 21b connected between the body of water 12 and the upwardly directed steam outlet conduit 22, and a horizontal connecting leg 23 between vertical segment 21a and globular vessel 11. The operation of the make-up water assembly 20 will be described hereinafter.

The upwardly directed steam outlet conduit 22, the suction legs 21a and 21b and the connecting leg 23 are each enveloped with insulation 24 to minimize heat loss by radiation.

Steam outlet conduit 22 leads to primary generator 25, provided with a steam-run turbine blade 26 which turns shaft 27 for the generation of electricity in the usual manner. The outflow steam lines 28 from generator 25 comprise a radiator 29, provided with radiator fins 29a for the simultaneous partial condensation of steam of dissipation of heat from the steam lines 28. Radiator 29 can alternatively, although not shown, be a water cooled heat exchanger system, with the flow of water being caused by a steam pump, using effluent steam from the generator 25. Radiator 29 leads to condenser 30, also provided with radiator fins 31, (or which a water cooled heat exchanger), where the condensation of the steam to water can be substantially completed. Effluent from the condenser 30 is to a reservoir 32.

The reservoir 32 is adapted to release its contents through sluice 33, controlled by valve 34 (which may be an automatic timed solenoid valve or a hand valve) to a secondary generator 35 to run a water-powered turbine blade 36 which turns shaft 37 for the generation of electricity in the usual manner. The outflow of pure water from effluent line 38 can be used for a variety of purposes.

The input of energy for the operation of the solar generator is by the mechanism of a paraboloid reflector 40 mounted on a post 41. By suitable control of reflector 40, rays 42 of the sun 43 are caused to impinge as a parallel stream into refractor lens 44. The rays concentrated by refractor 44 generate heat to cause the water in globular boiler 11 to boil.

OPERATION OF PREFERRED EMBODIMENT

Steam as it passes upwardly through steam outlet conduit 22 causes an aspirated suction to be set up in suction outlets 21a and 21b. The steam conduit 22 is shown in schematic form and does not show the standard water aspirator which is well known in the art. In one conventional description, it may be described in the following terms: "A jet of water is forced through a small orifice into a narrow chamber with sloping sides as to draw in air from a side tube". In the same way, the steam is forced through a small orifice into the steam outlet conduit (which actually is a narrow chamber with sloping sides) to provide a suction in side tube 21b boiled out of globular boiler 11, float 45 lowers to open check valve 46. This permits water to flow through suction leg 21a and connecting leg 23 to boiler 11.

When the correct equilibrium water level is reached, float 45 automatically shuts off the resupply of water.

Steam rising through steam outlet conduit 22 drives turbine 26 to generate electricity, is condensed to water in tubes 28 and condenser 30 and is stored in reservoir 32. Then it can perform additional useful work while flowing down through turbine 36 to generate more electricity. The effluent water is more useful as well because it is pure.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A combined solar power generator and water purifier comprising:
   (a) a hollow globular boiler floating on and anchored atop a body of water, said boiler including water inlet means disposed adjacent the upper portion of said globular boiler, an upwardly directed steam outlet conduit originating from an upper portion of said globular boiler, and a refractor lens window also disposed within an upper portion of said globular boiler;
   (b) controllable means for directing the sun's rays towards said refractor lens window to generate heat, to boil water in said boiler;
   (c) a primary turbine for the generation of electricity disposed at a level above that of said globular boiler, said primary turbine being connected to said steam outlet conduit and driven by steam under pressure from said globular boiler;
   (d) steam condenser means connected to an outlet from said primary turbine for substantially simultaneously dissipating residual heat in said steam effluent from said primary turbine and for condensing said steam to substantially pure water;
   (e) a reservoir connected to an outlet from said condenser means, said reservoir being disposed at a level lower than the level of said primary turbine, for receiving said substantially pure water;
   (f) a secondary turbine for the generation of electricity disposed at a level lower than that of said reservoir, said secondary turbine being connected to an outlet from said reservoir and being selectively driven by water from said reservoir; and
   (g) pure water effluent means from said secondary turbine.

2. The solar power generator of claim 1 wherein said steam condenser means includes a radiator connected to said primary turbine for simultaneously recovering useful heat from said steam and for partially condensing said steam to water, and a condenser connected to said radiator for substantially completely condensing said steam to water.

3. The solar power generator of claim 1 including a valve for controlling the flow of water from said reservoir to said secondary turbine.

4. The solar power generator of claim 1 including a valve automatically sequenced for periodic opening, to permit flow of water from said reservoir to said secondary turbine, and for closing to cut off said flow.

5. The solar power generator of claim 1 wherein said means (b) comprises a paraboloid reflector mounted on a post.

6. The solar power generator of claim 1 wherein said reservoir (e) is disposed at a level higher than the level of said globular boiler; and wherein said secondary turbine (f) is disposed at a level which is higher than that of said globular boiler.

* * * * *